United States Patent
Chang (10) Patent No.: US 10,634,491 B1
(45) Date of Patent: Apr. 28, 2020

(54) RANGING DEVICE PROVIDING SLOPE MEASUREMENT

(71) Applicant: TUNG SHRIM ENTERPRISE CO., LTD., Taichung (TW)

(72) Inventor: Wen-I Chang, Taichung (TW)

(73) Assignee: TUNG SHRIM ENTERPRISE CO., LTD., Taichung (TW)

( * ) Notice: Subject to any disclaimer, the term of this patent is extended or adjusted under 35 U.S.C. 154(b) by 0 days.

(21) Appl. No.: 16/202,055

(22) Filed: Nov. 27, 2018

(51) Int. Cl.
*G01C 3/02* (2006.01)
*G01C 9/00* (2006.01)

(52) U.S. Cl.
CPC .............. *G01C 3/02* (2013.01); *G01C 9/00* (2013.01)

(58) Field of Classification Search
CPC .................................. G01C 3/02; G01C 9/00
USPC ............................................... 356/600–640
See application file for complete search history.

(56) References Cited

U.S. PATENT DOCUMENTS

2018/0231377 A1* 8/2018 Vermillion ............... G01C 3/08

* cited by examiner

*Primary Examiner* — Tri T Ton
(74) *Attorney, Agent, or Firm* — Leong C. Lei (57) ABSTRACT

The ranging device includes a distance measurement unit, a slope measurement unit, and a transparent display electrically connected to the distance measurement unit and the slope measurement unit. The distance measurement unit detects and transmits a distance value to the display. The slope measurement unit detects and transmits a slope value to the display. The distance measurement unit includes first sensors, second sensors, and a processor. The first and second sensors respectively scan for at least one first target and a number of second targets from top to bottom and front left to right. The processor calculates distances to the first target and to the second targets to obtain a distance value of the first target and distance values of the second targets. The processor shows the distance values in the display sequentially according to their values from closest to farthest.

6 Claims, 7 Drawing Sheets

RANGING DEVICE PROVIDING SLOPE MEASUREMENT

BACKGROUND OF THE INVENTION

(a) Technical Field of the Invention

The present invention is generally related to the measurement of distance, and more particular to a ranging device that also provides slope measurement.

(b) Description of the Prior Art

Golf is a sport in which players use various clubs to hit balls into a series of holes on a course in as few strokes as possible. Two major factors affecting the number of strokes between the teeing ground and a hole on the putting green are distance and angle. There are also other factors such as wind and grass, but they are omitted here. A golfer therefore has to carefully control his/her strength and direction in driving the ball based on experience. For a newbie to the sport, he/she has to learn how to detect the driving distance and angle, other than the constant practice to perfect the skill. Japan Patent Publication No. JPH05157564 teaches a ranging device with a LCD display showing the measurement result.

This type of ranging device usually can only detect distance to a single target. If there are multiple targets, separate measurements, one for each target, have to conducted, and the measured distances have to be recorded separately.

In addition, according to the latest golf rules, the use of a ranging device capable of slope measurement has to be revealed to the competitors. Currently there is no way to tell if a ranging device has the slope measurement function turned on simply by the device's appearance.

SUMMARY OF THE INVENTION

Therefore, a novel ranging device is provided herein. The ranging device includes a first casing and a second casing. Inside the first casing, there are a distance measurement unit and a slope measurement unit. A front lens and a detection window beneath the front lens are disposed on a front side of the first casing. The distance measurement unit and the slope measurement unit are disposed correspondingly behind the detection window. A connection element are disposed to a back side of the first casing. A ring-shaped switch element is slidably disposed inside the connection element. The switch element is electrically connected to the slope measurement unit. The second casing has a transparent display on a front end and a rear lens on a back end of the second casing. The display is electrically connected to the distance measurement unit and the slope measurement unit. The second casing has its front end joined to the back side of the first casing so that the front lens corresponds to the rear lens. The second casing is surrounded by the connection element. The distance measurement unit detects and transmits a distance value to the display. The switch element, when pulled backward, activates the slope measurement unit, which detects and transmits a slope value to the display.

The slope measurement unit is an inclinometer. the slope measurement unit, based on the distance value provided by the distance measurement unit and the slope value provided by the slope measurement unit, an angle-compensated distance value is obtained and shown in the display.

The switch element is slidably configured on the second casing's circumference. and the second casing has a length greater than that of the switch element.

The distance measurement unit includes a plurality of first sensors, a plurality of second sensors, a processor, and a memory. The first sensors and the second sensors respectively scan for at least one first target and a plurality of second targets from top to bottom and front left to right. The processor calculates distances to the first target and to the second targets to obtain a distance value of the first target and distance values of the second targets. The processor shows the distance values in the display sequentially according to their values from closest to farthest. The processor also stores the distance values in the memory.

The first and second sensors are multi-axis accelerometers.

The display shows a crosshair for aiming the first target; and the display shows the distance value of the first target adjacent to the crosshair.

The display shows the distance values of the second targets around the crosshair and the first target.

The processor further provides a secondary distance value for each second target which is a distance between the first target to the second target, and the display shows each secondary distance value beneath the distance value of a corresponding second target.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
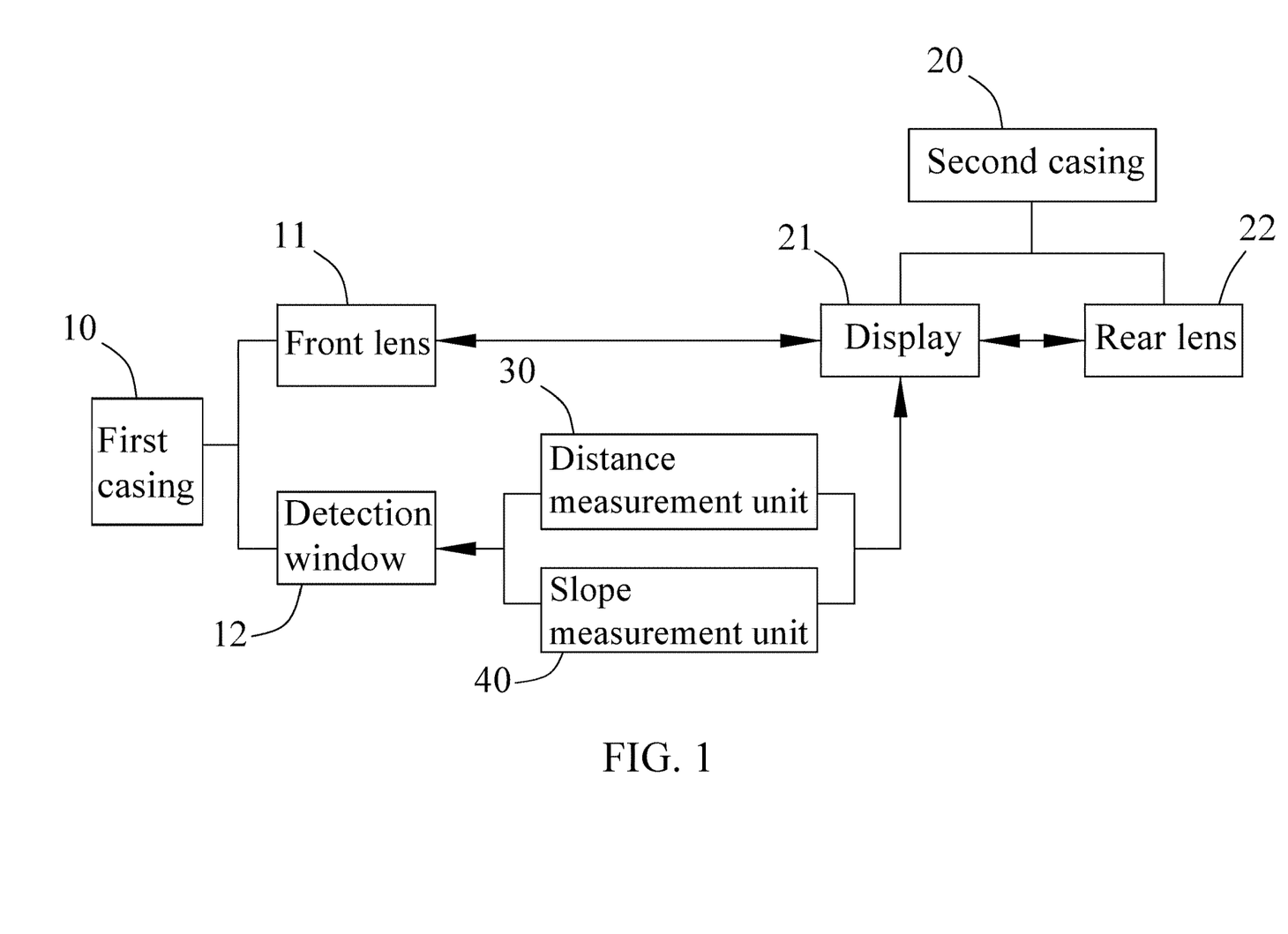
FIG. 1 is a functional block diagram showing a ranging device according to an embodiment of the present invention.
Figure 2:
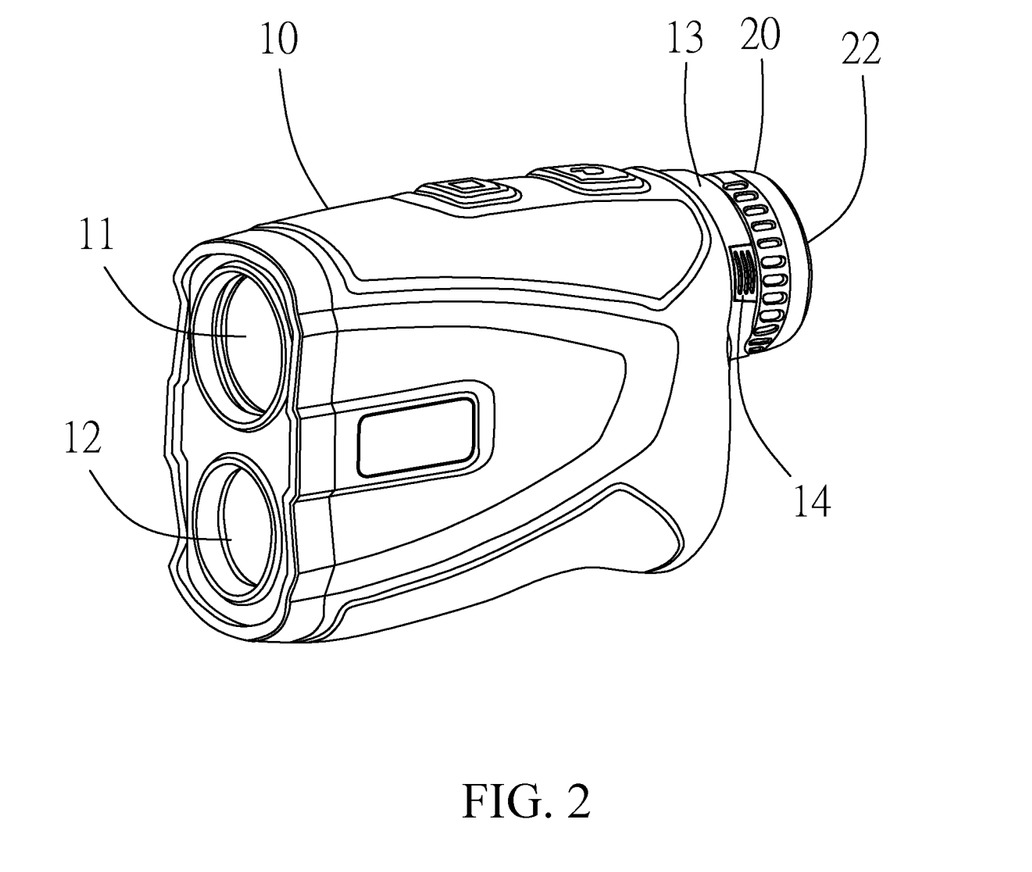
FIG. 2 is a perspective diagram showing the appearance of the ranging device of FIG. 1.
Figure 3:
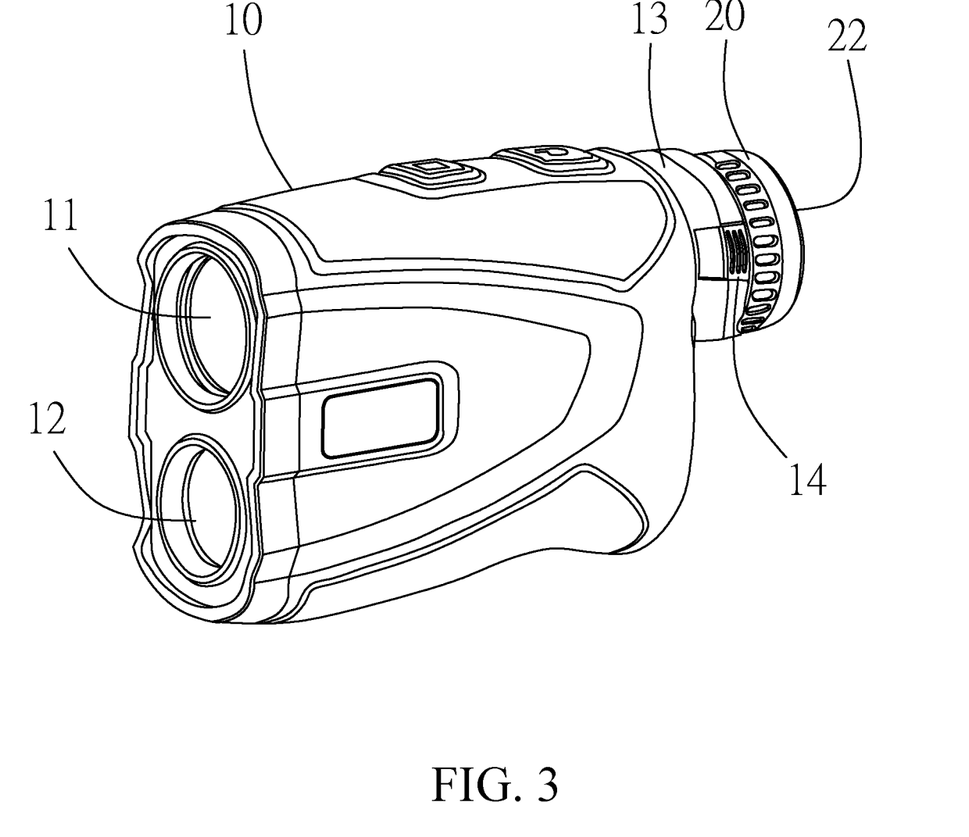
FIG. 3 is a perspective diagram showing the appearance of the ranging device of FIG. 1 when a switch element is activated.

As shown in FIGS. 1 to 3, a ranging device according to an embodiment of the present invention includes a first casing 10 and a second casing 20.

Inside the first casing 10, there are a distance measurement unit 30 and a slope measurement unit 40. A front lens 11 and a detection window 12 beneath the front lens 11 are disposed on a front side of the first casing 10. The distance measurement unit 30 and the slope measurement unit 40 are disposed correspondingly behind the detection window 12. A connection element 13 are disposed to a back side of the first casing 10. A ring-shaped switch element 14 is slidably disposed inside the connection element 13. The switch element 14 is electrically connected to the slope measurement unit 40.

The second casing 20 has a transparent display 21 on a front end and a rear lens 22 on a back end of the second casing 20. The display 21 is electrically connected to the distance measurement unit 30 and the slope measurement unit 40. The second casing 20 has its front end joined to the back side of the first casing 10 so that the front lens 11 corresponds to the rear lens 22. The second casing 20 is surrounded by the connection element 13. The distance measurement unit 30 detects and transmits a distance value 51 to the display 21. The switch element 14, when pulled backward, activates the slope measurement unit 40, which detects and transmits a slope value (not shown) to the display 21.

The slope measurement unit 40 is an inclinometer. Based on the distance value 51 provided by the distance measurement unit 30 and the slope value provided by the slope measurement unit 40, an angle-compensated distance value is obtained and shown in the display 21. A golfer may determine required strength and angle in hitting the ball.

The switch element 14 is slidably configured on the second casing 20's circumference and the second casing 20 has a length greater than that of the switch element 14.

Figure 4:
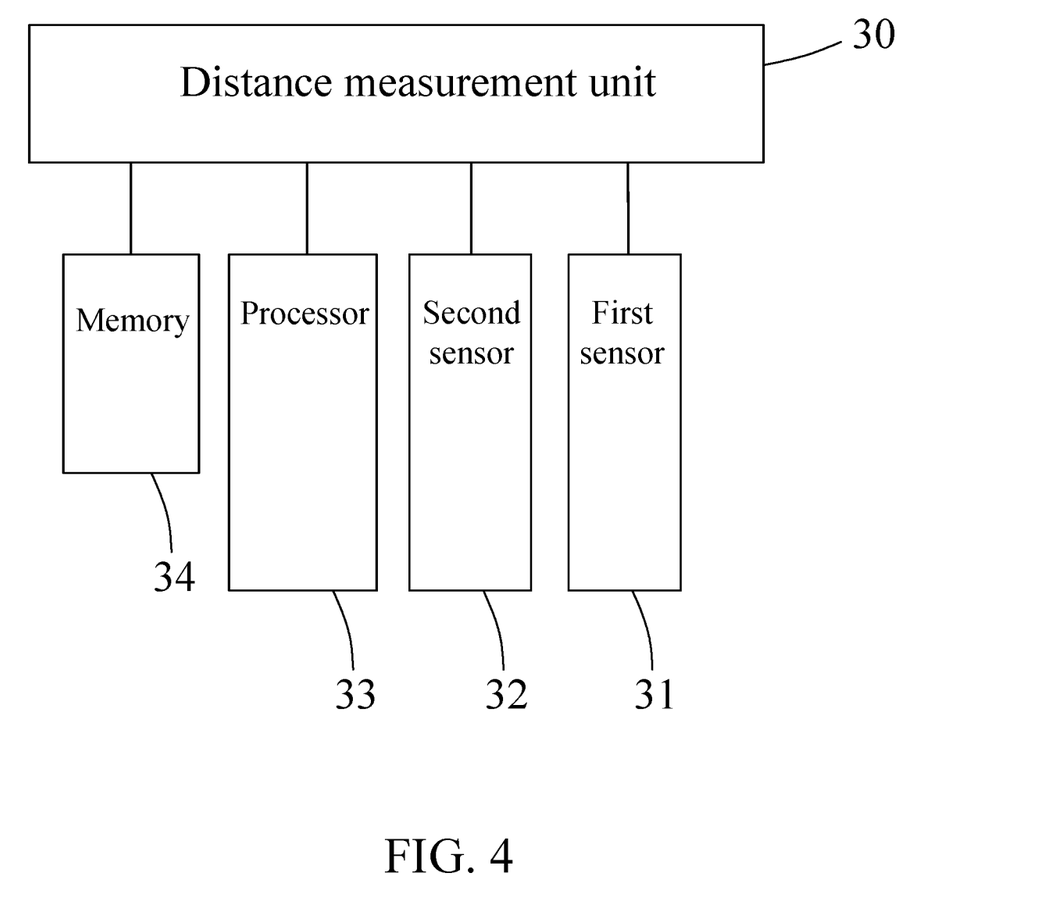
FIG. 4 is a functional block diagram showing a distance measurement unit of the ranging device of FIG. 1.
Figure 5:
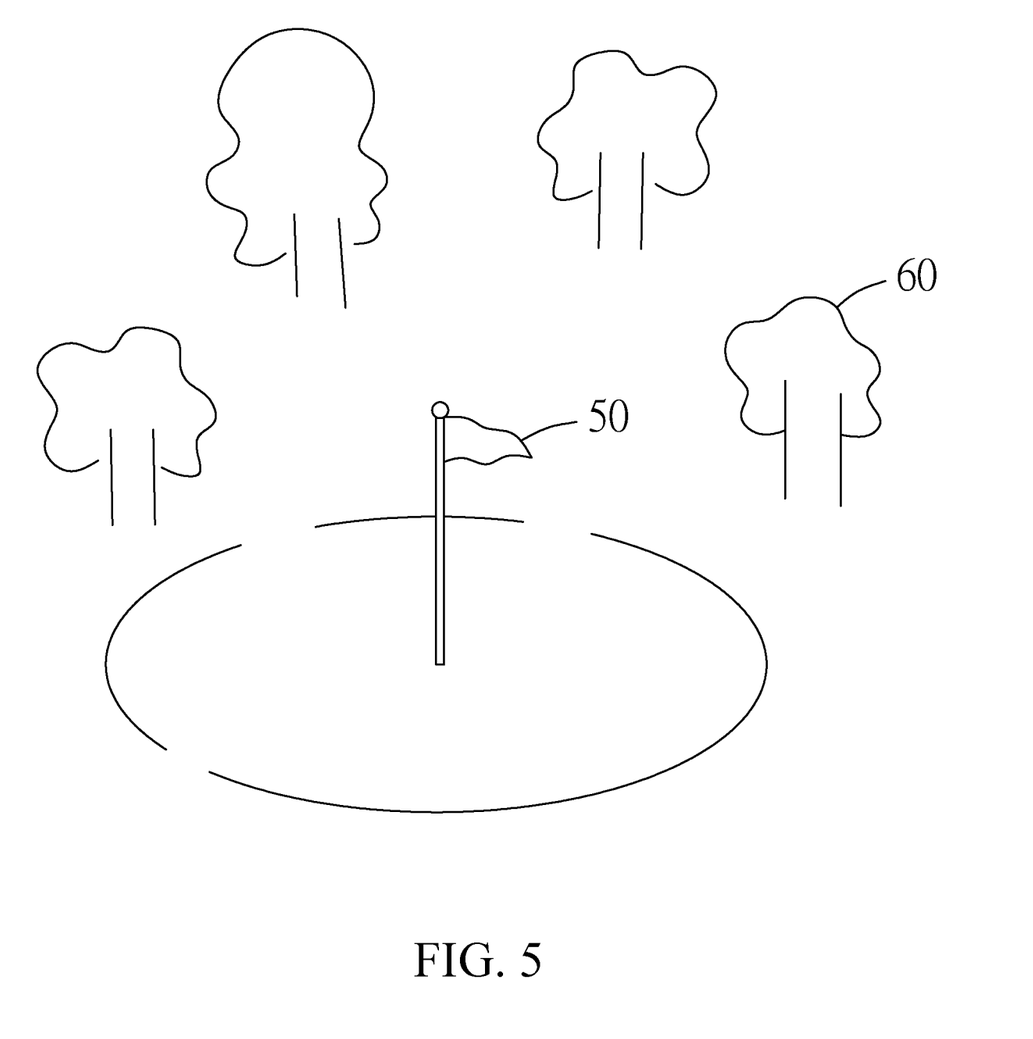
FIG. 5 shows an observed putting green.

As shown in FIG. 4, the distance measurement unit 30 is configured inside the first casing 10, and electrically connected to the display 21. The distance measurement unit 30 includes a number of first sensors 31, a number of second sensors 32, a processor 33, and a memory 34. The first sensors 31 and the second sensors 32 are multi-axis accelerometers.

The operation of the distance measurement unit 30 of the ranging device is as follows. As shown in FIGS. 1, and 4-7, a golfer observes a first target 50 and a number of second targets 60 through the front and rear lenses 11 and 22. In the present scenario, the first target 50 is the flagstick and the second targets 60 are the trees surrounding or behind the flagstick. The transparent display 21 provides a crosshair 211 for aiming the first target 50. Then, the first sensors 31 and the second sensors 32 respectively scan for at least a first target 50 and a number of second targets 60 from top to bottom and front left to right.

Figure 6:
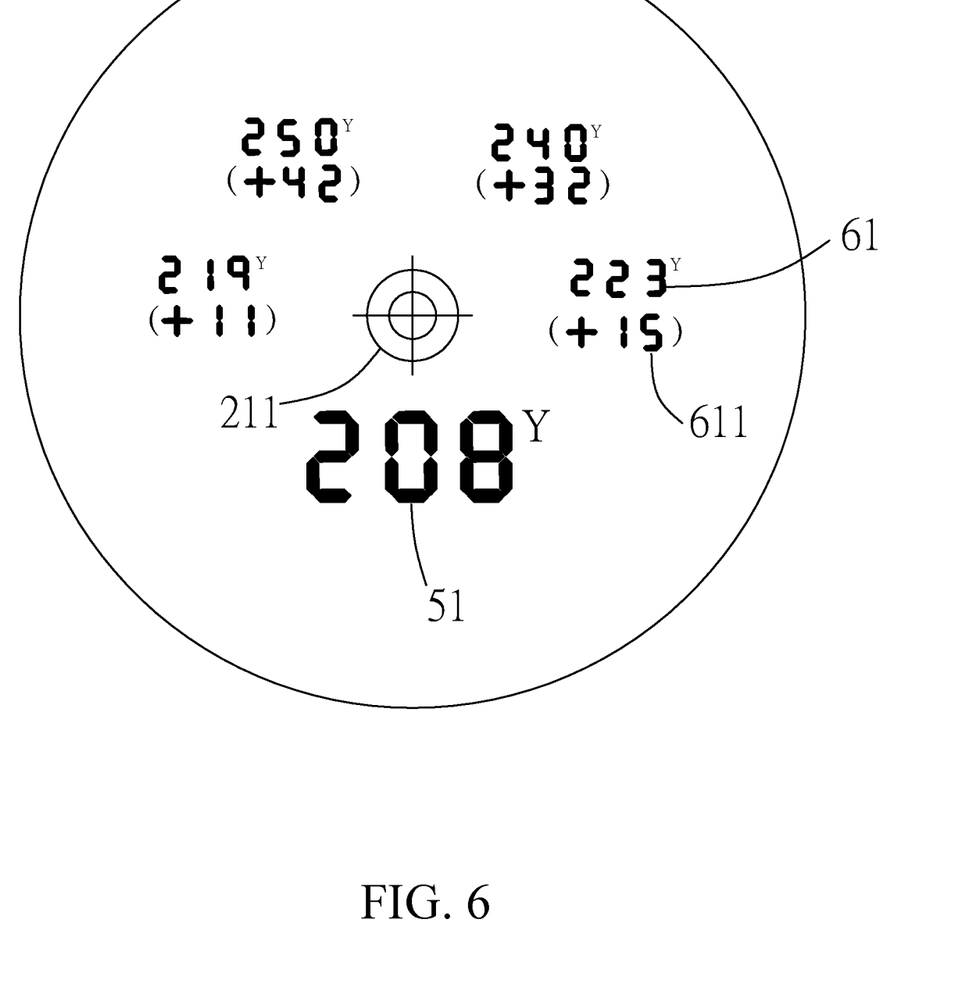
FIG. 6 shows distance values for the putting green of FIG. 5 measured and displayed by the ranging device of FIG. 1.

The processor 33 then calculates the distances to the first target 50 and to the second targets 60 to obtain the distance value 51 of the first target 50 and distance values 61 of the second targets 60. The processor 33 then shows the distance values 51 and 61 in the display 21 sequentially according to their values from closest to farthest. The distance value 51 is shown adjacent to the crosshair 211.

The processor 33 also stores the distance value 51 of the first target 50 and the distance values 61 of the second targets 60 in the memory 34 so that the golfer may later review the distance values 51 and 61 stored in the memory 34 without re-scanning the targets 50 and 60.

In addition, the processor 33 shows only those distance values 61 that the second targets 60 closest to the first target 50. As shown in FIG. 6, in this scenario, there are four second targets 60 that are closest to the first target 50. Their distance values 61 are shown around the first target 50 and the crosshair 211, each located at where a corresponding second target 60 is.

Through the calculation by the processor 33, a secondary distance value 611 is displayed beneath the distance value 61 of each second target 60. The secondary distance value 611 is the distance between the first target 50 to the second target 60.

Figure 7:
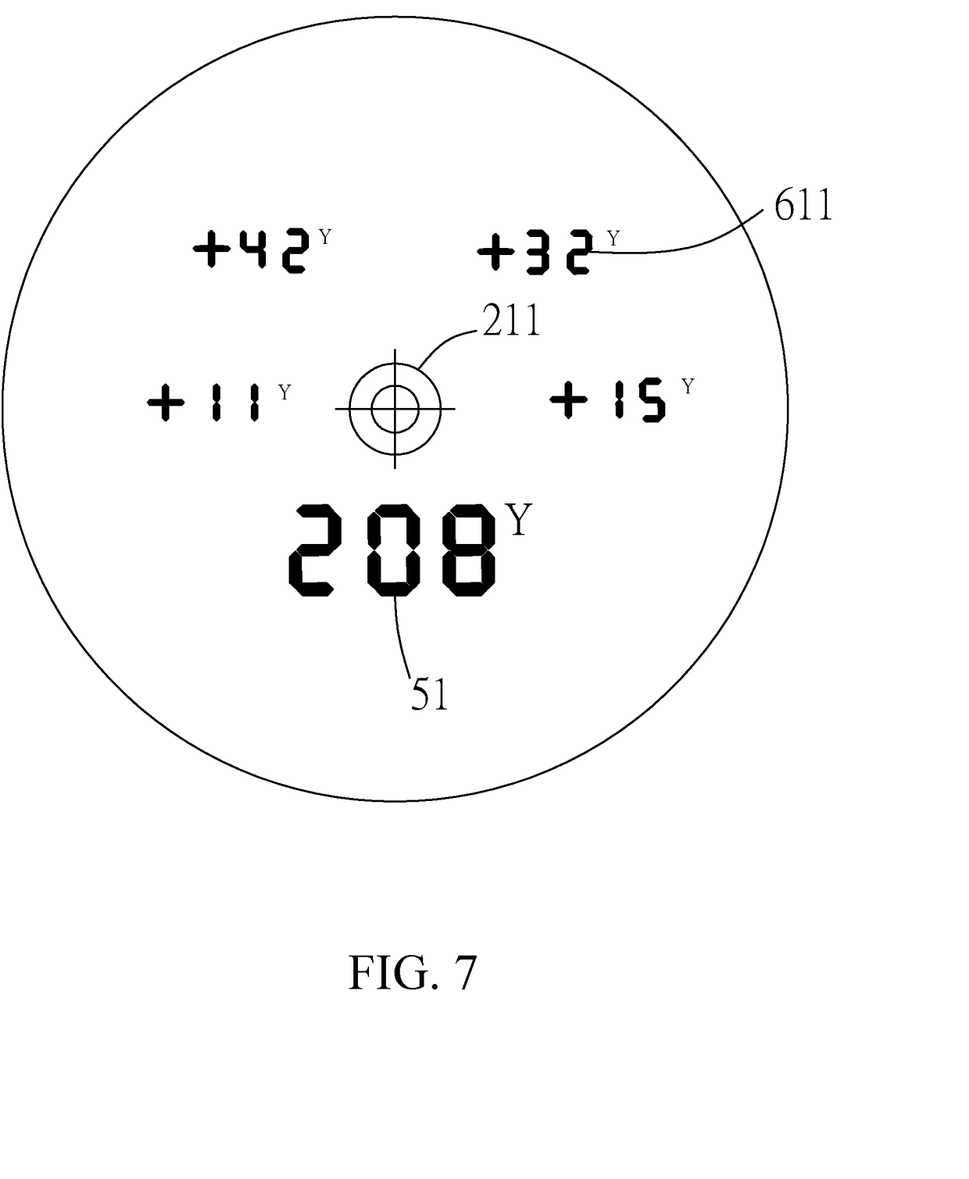
FIG. 7 shows distance values for the putting green of FIG. 5 measured and displayed by the ranging device of FIG. 1 in a different style.

As shown in FIG. 7, by the setting of the golfer, the display 21 may only show the distance value 51 of the first target 50, and the secondary distance values 611 of the various second targets 60 so as to fit the golfer's preference.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the claims of the present invention.

I claim:

1. A ranging device, comprising:
a first casing, where, inside the first casing, there are a distance measurement unit and an inclinometer which is connected in parallel with the distance measurement unit; a front lens and a detection window beneath the front lens are disposed on a front side of the first casing; the distance measurement unit and the slope measurement unit are disposed correspondingly behind the detection window; a connection element are disposed to a back side of the first casing; a ring-shaped switch element is slidably disposed inside the connection element; the switch element is electrically connected to the slope measurement unit; and
a second casing, where the second casing has a transparent display on a front end and a rear lens on a back end of the second casing; the display is electrically connected to the distance measurement unit and the slope measurement unit; the second casing has its front end joined to the back side of the first casing so that the front lens corresponds to the rear lens; the second casing is surrounded by the connection element; the distance measurement unit detects and transmits a distance value to the display; the switch element, when pulled backward, activates the slope measurement unit, which detects and transmits a slope value to the display;
wherein based on distance value provided by the distance measurement unit and slope value provided by the inclinometer, an angle-compensated distance valve is obtained and shown in the display;
wherein the distance measurement unit comprises a plurality of first sensors, a plurality of second sensors, a processor, and a memory; the first sensors and the second sensors respectively scan for at least one first target and a plurality of second targets from top to bottom and front left to right; the processor calculates distances to the first target and to the second targets to obtain a distance value of the first target and distance values of the second targets; the processor shows the distance values in the display sequentially according to their values from closest to farthest; and the processor stores the distance values in the memory.

2. The ranging device according to claim 1, wherein switch element is slidably configured on the second casing's circumference; and the second casing has a length greater than that of the switch element.

3. The ranging device according to claim 1, wherein the first and second sensors are multi-axis accelerometers.

4. The ranging device according to claim 1, wherein the display shows a crosshair for aiming the first target; and the display shows the distance value of the first target adjacent to the crosshair.

5. The ranging device according to claim 1, wherein the display shows the distance values of the second targets around the crosshair and the first target.

6. The ranging device according to claim 5, wherein the processor further provides a secondary distance value for each second target which is a distance between the first target to the second target; and the display shows each secondary distance value beneath the distance value of a corresponding second target.

* * * * *